US005273253A

United States Patent [19]

Rogers

[11] Patent Number: 5,273,253

[45] Date of Patent: Dec. 28, 1993

[54] FIRE HOSE CLAMP

[76] Inventor: Craig L. Rogers, 1037 Ruf Rd., Colfax, Calif. 95713

[21] Appl. No.: 988,185

[22] Filed: Dec. 8, 1992

[51] Int. Cl.[5] ................ F16K 7/04

[52] U.S. Cl. ................ 251/9; 24/543

[58] Field of Search ................ 251/9, 10, 7, 4; 24/543, 134 L, 134 R, 132 R

[56] References Cited

U.S. PATENT DOCUMENTS

| | | | |
|---|---|---|---|
| 1,897,743 | 2/1933 | Warner . | |
| 2,009,907 | 7/1935 | Teuber | 251/5 |
| 2,064,919 | 12/1936 | Kellam | 251/5 |
| 2,796,228 | 6/1957 | Kelly | 251/7 |
| 2,825,525 | 3/1958 | Kellam | 251/9 |
| 3,460,797 | 8/1969 | Allenbaugh | 251/9 |
| 3,477,686 | 11/1969 | Engelsher et al. | 24/134 R |
| 3,515,367 | 6/1970 | Ziaylek, Jr. | 251/9 |
| 4,077,601 | 3/1978 | Dick | 251/9 |
| 4,582,292 | 4/1986 | Glotzback | 251/9 |
| 5,152,497 | 10/1992 | Bissell | 251/9 |

OTHER PUBLICATIONS

IFSTA Manual—"Fundamentals of Firefighting"; p. 231; date unknown.

Cascade Fire Equipment Company Catalog; p. 36; date unknown.

Wajax Pacific Catalog; p. 87; date unknown.

Solon Company; p. 102; date unknown.

*Primary Examiner*—Martin P. Schwadron

*Assistant Examiner*—Kevin L. Lee

*Attorney, Agent, or Firm*—Joseph E. Gerber

[57] ABSTRACT

A Fire Hose Clamp is disclosed, this clamp being comprised of a shaft with a first jaw rigidly projecting from a first of its ends; a second jaw opposing the first, slidably mounted on the shaft between the shaft's first and second ends; a lever arm pivotally affixed via its first end to the shaft's second end at a first joint; and, a pitman having a first end pivotally affixed at a second joint to the lever arm between the lever arm's first and second ends, the pitman having a second end pivotally affixed to the second jaw at a third joint. Movement of the lever arm toward the shaft's first end causes the jaws to occlude.

21 Claims, 3 Drawing Sheets

FIRE HOSE CLAMP

BACKGROUND OF THE INVENTION

1. Field Of The Invention

The present invention relates generally to hose clamps, and more specifically to a clamp for stopping the flow of water through a fire hose.

2. Description Of The Related Art

As firefighters carry out their work, the need frequently arises to cut off the flow of water in a hose. This is necessary, for example, when one desires to add or switch a nozzle, a tip, a coupling or another length of hose at a hose's end. Such maneuvers are virtually impossible to carry out on a flowing or pressurized hose. Yet, it is inefficient to shut off the water at the source and to depressurize the entire hose to make an equipment switch or addition at its far end. Instead, the preferred procedure is to clamp off the hose's downstream end, thereby reducing water pressure to zero below the clamp and preserving upstream pressure. Then the equipment is changed or added as necessary, and once the operation is complete the clamp may simply be released for nearly instant restoration of full water pressure.

Clamps are particularly useful to those who fight wildland fires, where end-to-end, 100-foot lengths of hose may commonly be run over one-half mile to a fire site. Likewise, in high-rise buildings, firefighters frequently work 3 to 4 hose lengths from the water source. In these environments it becomes exceedingly inconvenient to return to the upstream end of the hose to halt the flow of water, or to communicate to another to do so, in order to change equipment on the hose's far end.

Many different clamps are known and used for the purpose of temporarily restricting flow in charged fire hoses, but most are rather large, cumbersome and somewhat difficult to use. For example, see the devices of U.S. Pat. No. 3,460,797 issued to Allenbaugh, Jr. in 1969; U.S. Pat. No. 4,582,292 issued to Glotzback, et al. in 1986; U.S. Pat. No. 1,897,743 issued to Warner in 1933; U.S. Pat. No. 2,009,907 issued to Teuber in 1935 and, U.S. Pat. Nos. 2,064,919 and 2,835,525 issued to Kellam in 1936 and 1958, respectively. As wildland and high-rise firefighters must be extremely mobile and able to cover long distances on foot, as well as being self-sufficient and outfitted with a full set of lightweight yet versatile gear, it is apparent from the disclosures of all the above patents that the devices therein are not well-suited for such use.

One genera of relatively lightweight fire hose clamp has arisen to meet wildland and high-rise firefighters' needs, but these too have drawbacks. Examples of these include the "Forestry" hose clamp no. 11213 available from Cascade Fire Equipment Company of Medford, Oregon and the "hose shut off clamp no. 5-360W" (commonly known as the "Sierra" clamp) available from Wajax Pacific Fire Equipment Company of Kent, Wash. Both include a hinged pair of jaws, across the outer ends of which a spanner is hooked to entrap a hose. A lever linked to the spanner is used to draw the hose-grasping jaws together, and a lock ring secures the lever against the outside of one of the jaws. Although such devices are fairly small in size and can be carried in a holster, drawbacks include narrow limits on the hose sizes a single unit may accommodate, and a great risk of injury or damage occurring as such a clamp is released from a charged hose. Further, such clamps are not able to be used on hoses charged with full static pressure; at least a small bit of pressure must be bled off as by letting the hose trickle to permit one of normal strength to fit such clamps in place safely.

And finally, a complicated, two-handed operation is required to install the Forestry and Sierra clamps properly. Thus, it takes new firefighters a considerable amount of time and practice to learn their safe and efficient use.

Accordingly, it appears that currently-available hose clamps do not address the need for a piece of lightweight, handy, versatile, and safe-to-use personal equipment able to be conveniently carried by each member of a wildland or high-rise firefighting engine crew.

SUMMARY OF THE INVENTION

The fire hose clamp of the present invention is adapted to overcome the above-noted shortcomings and to fulfill the stated needs. In its broadest description it comprises: a shaft with a first jaw rigidly projecting from a first of the shaft's ends; a second jaw opposing the first, slidably mounted on the shaft between the shaft's first and second ends; a lever arm having first and second ends and being pivotally affixed via its first end to the shaft's second end at a first joint; and, a pitman having a first end pivotally affixed at a second joint to the lever arm between the lever arm's first and second ends, the pitman having a second end pivotally affixed to the second jaw at a third joint. In this combination, when the lever arm is moved toward the shaft's first end, the jaws occlude.

The preferred embodiment of the invention, as disclosed herein below, includes objects, features and advantages that make it wholly superior to all other clamps for its intended use. These include an inventively unique direct jaw adjustment mechanism that, when incorporated into a hose clamp having an overall length of roughly 12 inches, facilitates use with synthetic, single-jacket or double-jacket hose in sizes from $\frac{3}{4}$'' to $1\frac{3}{4}$'', inside diameter.

In addition, the preferred embodiment is configured so as to permit it to be carried in a holster and when needed to be withdrawn with one hand, whereupon it drops open with its jaws spread and readied to receive a hose. Once the clamp is placed open and upright upon the ground, and a hose is in place between the clamp's jaws, the clamp may simply be pressed shut with one's foot. Of course, hand closure is equally uncomplicated and no more than normal strength is required.

Yet another advantage is that a fire hose clamp having a pair of opposing, vertical-faced jaws driven by a mechanism which gives them a horizontally-directed occluding action virtually eliminates the likelihood that a hose will jump from between the jaws while being clamped.

Further, versatility is unmatched—not only for its adjustability, but because this very compact clamp's superiorly-engineered leverage-generating mechanism delivers sufficient mechanical advantage to permit its jaws to clamp off a hose to which 200 pounds or more of static water pressure is being supplied. That is, a hose holding static pressure need not be allowed to trickle for one of normal strength to put this clamp in place. And, clamping off a flowing hose with the inventive device is easier still.

Finally, the leverage-generating mechanism of the inventive clamp is uniquely suited to providing, just by the relative placement of its joints, an elegantly simple, yet exceptionally safe and effective, over-center locking action. And, this over-center locking action, and its apparatus, cooperate well with the jaw adjusting function and mechanism, noted above.

Still further objects, features and advantages of the inventive fire hose clamp disclosed herein will be apparent from the drawings and following detailed description thereof.

DESCRIPTION OF THE PREFERRED EMBODIMENT

Figure 1:
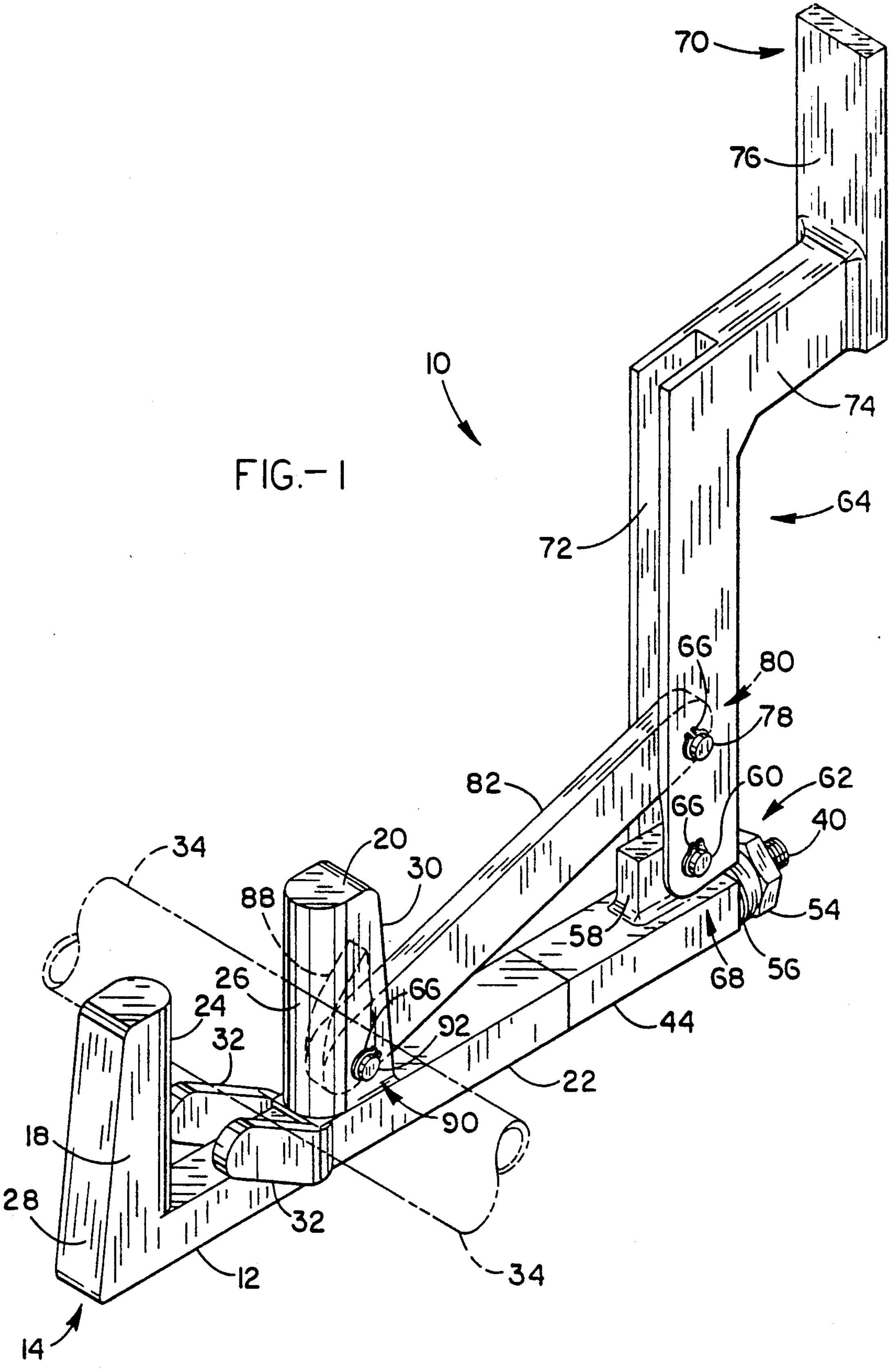
FIG. 1 is a perspective view of the fire hose clamp of the invention in an open position having a length of fire hose laid within its jaws, the fire hose being shown in phantom line.
Figure 2:
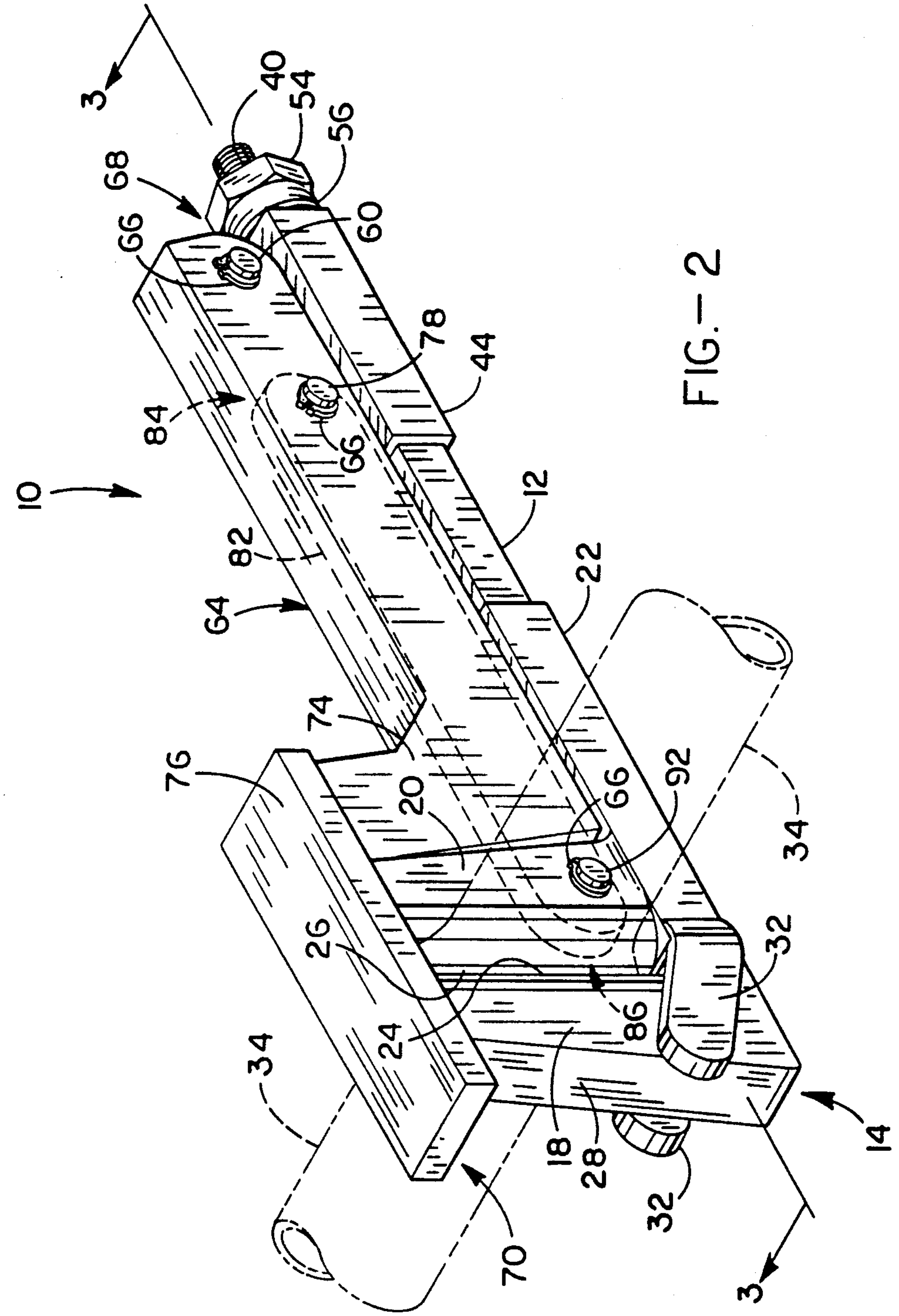
FIG. 2 is a perspective view of the fire hose clamp shown in FIG. 1 in a closed position having a length of fire hose clamped between its jaws, the fire hose being shown in phantom line.

Referring now specifically to the drawings, FIGS. 1 and 2 show the inventive fire hose clamp, which is generally identified herein with the reference numeral 10. Descriptions herein below relying on directional orientation are set forth under the presumption that clamp 10 is set in a generally vertical, upright posture on a horizontal surface as suggested in FIGS. 1 and 2.

Clamp 10's primary structural element is shaft 12 which is rigid, solid throughout, and square in cross-section. Shaft 12 has first and second ends, these being identified as forward end 14 and rearward end 16, respectively. A first, or forward, jaw 18 is integral with and upstanding from shaft 12's forward end 14. A second, or rearward, jaw 20 opposes forward jaw 18, and is integral with and upstanding from sliding sleeve 22.

Forward and rearward jaws, 18 and 20, oppose one-another. Each is preferably trapezoidal in profile, jaw 18 having a vertical grasping face 24 at a right angle to shaft 12, and jaw 20 having a vertical grasping face 26 at a right angle to sleeve 22. The jaws' outer faces 28 and 30, respectively, are opposingly sloped to help transfer forces acting outward on the jaws, especially from between their upper portions, away from the horizontal shear lines where grasping faces 24 and 26 meet shaft 12 and sleeve 22, respectively.

Grasping faces, 24 and 26, of jaws 18 and 20 are rounded in the horizontal plane, as best seen in FIG. 1, and have apices which meet along their length when the jaws are fully occluded.

Sliding sleeve 22 is comprised of a length of square tube stock having inside dimensions which permit shaft 12 and sleeve 22 to slide securely with respect to one-another. That is, shaft 12 slides within sleeve 22's bore. It should be understood that shaft 12 and sleeve 22 may have other mating noncircular cross-sections and that these may also work well, as long as the mating shapes of shaft 12 and sleeve 22 do not permit them to rotate with respect to one-another.

A pair of planar, round-ended, upwardly-inclined members 32 are integral with and project from either side of the forward end of sliding sleeve 22's bore. Upwardly-inclined members 32 are for preventing a fire hose 34 placed between jaws 18 and 20 from being grasped too low in the jaws or from seating on the shaft, thereby protecting the hose from being pinched and damaged as by a small portion of the hose's outer casing being caught in the sliding telescopic junction between shaft 12 and sleeve 22 when the jaws occlude. Upwardly-inclined members 32 are preferably of sufficient length to span at least half the space between jaws 18 and 20 when the jaws are fully spread apart. And, it has been found that an upward slope of roughly 30 degrees, or so, with respect to shaft 12 and sleeve 22 is satisfactory. It should be understood that such upwardly-inclined members are also expected to work satisfactorily if mounted to project rearward from the forward jaw. And, other angles of slope may also work well.

Figure 3:
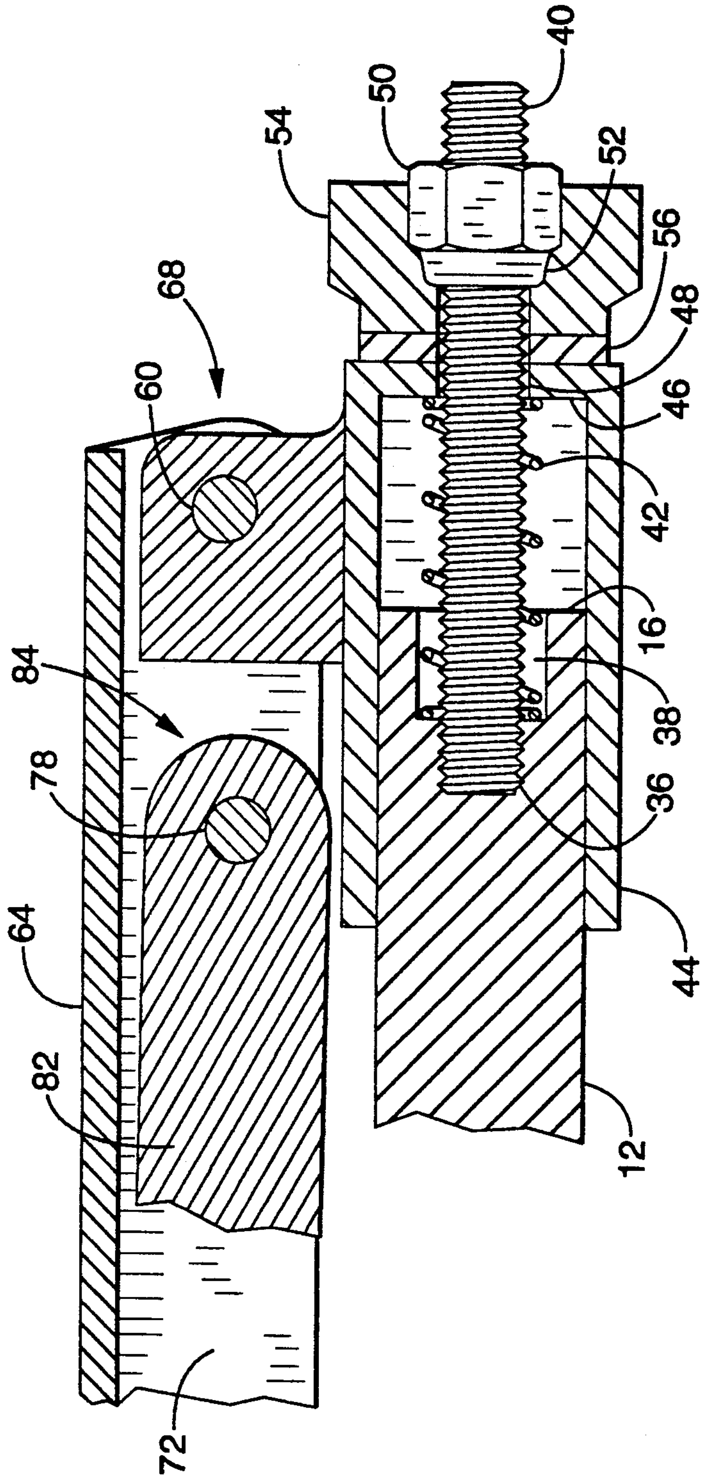
FIG. 3 is a sectional view through the fire hose clamp's end member and adjacent elements, showing the mechanism for adjusting the effective length of the shaft.

As shown in FIG. 3, shaft 12's second, or rearward, end 16 has a threaded, axial bore 36 and a shallower, nonthreaded, coaxial well 38. An elongate, threaded rod 40 seats in bore 36 and a coil spring 42 seats in well 38 in coaxial relation to rod 40. Rod 40 is somewhat longer than spring 42.

An end member 44, comprised of a length of square tube stock, slidingly receives shaft 12's rearward end 16. End member 44 is preferably fashioned of the same stock as sliding sleeve 22; thus, it has an inside shape and dimensions which permit it to slide securely with respect to shaft 12. The rearward extent of end member 44 is capped with end wall 46 through which a central, nonthreaded aperture 48 is provided. Aperture 48 permits rod 40 to pass therethrough, but end wall 46 bears against spring 42.

The rearward end of rod 40 (unnumbered) receives a hex nut 50 which seats in a like-shaped space 52 in nut handle 54. Nut handle 54's large size makes it easier to manipulate by hand than the smaller hex nut 50; and, as hex nut 50 wears, it is easily replaced by another small, standard hex nut. A washer 56 reduces friction between nut handle 54 and end wall 46. Thus, it should be apparent that manipulation of nut handle 54 selectively increases or decreases the effective length of shaft 12.

A generally rectangular tab 58 is upstanding from and integral with the rearward upper surface of end member 44. Tab 58 has an aperture therethrough which receives a first cylindrical pin 60, thus defining a first joint 62 at which a lever arm 64 is pivotally affixed. First pin 60 is perpendicular to the length of lever arm 64, and is preferably held in place with a pair of circular spring clips 66 which seat in grooves at its ends, but other common constructions may suffice.

Lever arm 64 is generally rectangular and has first and second ends, numbered 68 and 70, respectively. The first end 68 of lever arm 64 is that end through which first pin 60 is driven. Tab 58 nests within a channel 72 which runs the length of the underside of that half, or so, of lever arm 64 closest its first end 68. A central portion 74 of lever arm 64 jogs upward to support a widened, generally planar pad 76 which overlies jaws 18 and 20 when lever arm 64 is generally parallel to shaft 12.

A second pin 78 is driven perpendicularly through lever arm 64 spanning channel 72, thus defining a second joint 80 at which an elongate pitman 82 is pivotally affixed. Pitman 82 has first and second ends, 84 and 86, first end 84 being the one jointed with lever arm 64. Pitman 82 is fashioned of bar stock and preferably has a rectangular cross section. Its cross-sectional dimensions need to be such that it will nest easily within channel 72.

The second end 86 of pitman 82 is pivotally affixed to rearward jaw 20. Pitman 82's second end 86 fits into, and pivots in, a hollow 88 in jaw 20's rearward, outer face 30. Thus, a third joint 90 is defined, third pivot pin 92 spanning hollow 88 in a generally perpendicular relation to the length of pitman 82.

An important feature of the inventive clamp that flows from the interrelationship of its several elements is that it has an over-center locking action. This is made possible in the preferred embodiment of the invention by placing second pin 78 slightly lower than first pin 60 and second pin 92, noting that pins 60 and 92 reside in a single plane which is parallel to shaft 12. Pin 78's slightly lower position is apparent in FIG. 3. Although the above relationship is employed in the preferred embodiment, it should be understood that a wide range of potential placement points for the three pinned joints exists within the bounds of the invention, while preserving the over-center locking action. Most broadly, the necessary relationship of the three pins, which act as axes of their respective joints, can be stated as follows: as long as pitman 82 is disposed between lever arm 74 and rearward jaw 20 such that when the lever arm is rotated so that its second end 70 is moved fully forward the lever arm reaches a point where a line from the center of third pin 92 through second pin 78 and beyond will intersect a line through first and third pins 60 and 92, between the first and third pins, an over-center locking action will result. And, moreover, the greater the angle of the line through third and second pin 92 and 78, with respect to the line between third and first pin 92 and 60, the stronger the over-center locking force will be.

In use, when clamp 10 is opened to receive a fire hose, the length of the rearward end of sleeve 22, and the slightly obtuse angle between the first end of lever arm 64 and its upper surface (see FIG. 3), cooperate to permit lever arm to rest slightly rearward of the vertical in a stable, opened posture as in FIG. 1. As should be apparent from the above description and the accompanying drawings, when a fire hose 34 is laid between jaws 18 and 20, and lever arm 64 is thrown fully forward such that it seats stably in parallel relation to shaft 12, pitman 82 is likewise thrown forward thereby causing the vertical-faced jaws to occlude horizontally and to halt the flow of water in the hose. When it is desired that some space be preserved between the occluded jaws, as to accommodate a thicker hose or to permit a partial flow to be maintained, nut handle 54 may be turned counter-clockwise to separate the jaws a bit. And, when the preferred relationship of joints is used, the over-center locking lever mechanism is smooth and easy to release by hand. Yet it is safe and reliable, and very unlikely to pre-release unexpectedly.

The foregoing detailed disclosure of the inventive fire hose clamp 10 is considered as only illustrative of the preferred embodiment of, and not a limitation upon the scope of, the invention. Those skilled in the art will envision many other possible variations of the structure disclosed herein that nevertheless fall within the scope of the following claims. For example, if one wishes to dispense with the adjustability afforded by inclusion of end member 44 and its associated hardware, tab 58 and lever arm 64 may simply be mounted upon the rearward end of shaft 12, permitting the clamp to perform identically, yet without adjustability. Of course, in this case, the same rules for placement of the first, second and third joints would have to be observed. And, other modifications may also be apparent.

Likewise, one may opt for an alternative locking mechanism for the inventive clamp and eliminate the over-center locking relationship of the joint pins. But, such a device would continue to be within the scope of the invention.

It is also envisioned that alternative uses for this inventive hose clamp may later be realized. Accordingly, the scope of the invention should be determined with reference to the appended claims, and not by the examples which have herein been given.

I claim:

1. A hose clamp, comprising:
   a. a shaft having first and second ends;
   b. a first jaw rigidly projecting from said shaft's first end;
   c. a second jaw slidingly mounted on said shaft between said shaft's first and second ends such that said second jaw opposes said first jaw;
   d. a lever arm having first and second ends, said lever arm's first end being pivotally affixed to said shaft's second end at a first joint; and,
   e. a pitman having a first end pivotally affixed at a second joint to said lever arm between said lever arm's first and second ends, said pitman having a second end pivotally affixed to said second jaw at a third joint, whereby when said lever arm is fully rotated toward said shaft's first end said first and second jaws occlude.

2. The clamp of claim 1, wherein said shaft has a cross-section which is noncircular.

3. The clamp of claim 1, wherein said second jaw rigidly projects from a sleeve comprised of a length of tube stock having an inside shape and dimensions which permit said shaft and said sleeve to slide securely with respect to one-another.

4. The clamp of claim 1, wherein, when said clamp is in use on a horizontal surface, said jaws move horizontally toward one-another in occluding.

5. The clamp of claim 1, wherein said jaws have opposing vertical grasping faces.

6. The clamp of claim 1, wherein said lever arm is able to seat stably in parallel relation to said shaft.

7. The clamp of claim 6, wherein said pitman nests within a channel in said lever arm when said lever arm is so seated.

8. The clamp of claim 1, further including means for providing an over-center locking action for said lever arm.

9. The clamp of claim 1, wherein said pitman is disposed between said lever arm and said second jaw such that when said lever arm's second end is moved toward said shaft's first end, said lever arm reaches a point where a line from said third joint through said second joint and beyond will intersect a line through said first and third joints between said first and third joints, thereby resulting in said hose clamp having an over-center locking action.

10. The clamp of claim 1, further including means for adjusting the effective length of said shaft, whereby said jaws may selectively be caused to occlude more closely or wider apart once said lever arm is moved fully toward said shaft's first end.

11. The clamp of claim 10, wherein said adjusting means comprises an end member secured to said shaft's second end.

12. The clamp of claim 1, wherein said shaft's second end includes a threaded rod and nut which bind an end member to said shaft, said lever arm being affixed at said first joint to said end member of said shaft, rotation of said nut permitting selective control of said jaws to occlude more closely or wider apart once said lever arm is moved fully toward said shaft's first end.

13. The clamp of claim 1, further including means for preventing a hose placed between said jaws from being pinched when said jaws occlude.

14. The clamp of claim 13, wherein said preventing means includes at least one upwardly-inclined member projecting from a lower portion of one of said jaws.

15. A hose clamp, comprising:

a. a horizontal shaft having first and second ends;

b. a first jaw rigidly projecting from said shaft's first end, said jaw having a vertical grasping face;

c. a second jaw slidingly mounted on said shaft between said shaft's first and second ends, said second jaw having a vertical grasping face such that said second jaw opposes said first jaw;

d. a lever arm having first and second ends, said lever arm's first end being pivotally affixed to said shaft's second end at a first joint; and, e. a pitman having a first end pivotally affixed at a second joint to said lever arm between said lever arm's first and second ends, said pitman having a second end pivotally affixed to said second jaw at a third joint, whereby when said lever arm is fully rotated toward said shaft's first end said first and second jaws occlude horizontally.

16. The clamp of claim 15, wherein said second jaw rigidly projects from a sleeve comprised of a length of tube stock having an inside shape and dimensions which permit said shaft and said sleeve to slide securely with respect to one-another.

17. The clamp of claim 15, further including means for adjusting the effective length of said shaft, whereby said jaws may selectively be caused to occlude more closely or wider apart once said lever arm is moved fully toward said shaft's first end.

18. The clamp of claim 15, further including means for preventing a hose placed between said jaws from being pinched when said jaws occlude.

19. A hose clamp, comprising:

a. a shaft having first and second ends;

b. a first jaw rigidly projecting from said shaft's first end;

c. a second jaw slidingly mounted on said shaft between said shaft's first and second ends such that said second jaw opposes said first jaw;

d. means for adjusting the effective length of said shaft;

e. a lever arm having first and second ends, said lever arm's first end being pivotally affixed to said shaft's second end at a first joint; and, f. a pitman having a first end pivotally affixed at a second joint to said lever arm between said lever arm's first and second ends, said pitman having a second end pivotally affixed to said second jaw at a third joint, whereby when said lever arm is moved fully toward said shaft's first end said first and second jaws occlude, and said lever arm seats stably with an over-center locking action.

20. The clamp of claim 19, wherein said second jaw rigidly projects from a sleeve comprised of a length of tube stock having an inside shape and dimensions which permit said shaft and said sleeve to slide securely with respect to one-another.

21. The clamp of claim 19 ,further including means for preventing a hose placed between said jaws from being pinched when said jaws occlude.

* * * * *